United States Patent [19]
Porawski

[11] Patent Number: 4,755,956
[45] Date of Patent: Jul. 5, 1988

[54] FREEZE FRAME APPARATUS FOR MOVING MAP DISPLAY SYSTEM

[75] Inventor: Donald J. Porawski, Cedar Grove, N.J.

[73] Assignee: Allied-Signal Inc., Morris Township, Morris County, N.J.

[21] Appl. No.: 794,020

[22] Filed: Nov. 1, 1985

[51] Int. Cl.⁴ .......................... G06F 15/66; H04N 9/11
[52] U.S. Cl. ...................................... 364/518; 358/54; 364/521
[58] Field of Search ............... 364/518, 521, 424; 37340/703, 720; 358/54–56, 64

[56] References Cited

U.S. PATENT DOCUMENTS

| 4,427,994 | 1/1984 | Aron et al. | 358/54 |
| 4,504,913 | 3/1985 | Miura et al. | 364/424 X |
| 4,571,684 | 2/1986 | Takanabe et al. | 364/521 X |
| 4,630,120 | 12/1986 | Childs | 358/54 X |
| 4,646,134 | 2/1987 | Komatsu et al. | 364/521 X |
| 4,675,842 | 6/1987 | Szenes et al. | 364/518 X |

Primary Examiner—Gary V. Harkcom
Assistant Examiner—H. R. Herndon
Attorney, Agent, or Firm—Howard G. Massung

[57] ABSTRACT

Apparatus for use with a moving map display system for freezing the moving map at a predetermined position. Analog video signals corresponding to the predetermined map position are digitized and stored in memory. The digitized signals are retrieved and converted back to video signals for continuous display during the freezing function. The moving map display system returns to normal operation upon completion of the function. A built in test capability is implemented by switching in a fixed signal, converting and storing, and then verifying the signal in memory.

8 Claims, 2 Drawing Sheets

FREEZE FRAME APPARATUS FOR MOVING MAP DISPLAY SYSTEM

BACKGROUND OF THE INVENTION

Pilots of modern high speed aircraft such as, but not limited to, military aircraft require accurate navigation information without utilizing valuable time tracking the position of the aircraft with an unwieldy hard to read folding paper map. Moving map display systems have been developed for providing a continuous high resolution map video signal in both color and monochromatic formats to a front and center aircraft cockpit multifunction display. The map display is converted from currently available 35 mm film strips to a video output. The film strips are housed in cassettes and the moving map display automatically aligns with and tracks the present position of the aircraft. The film cassette is servo driven and contains as much as 60 feet of film corresponding to 550 square feet of maps. In order to minimize cockpit clutter, systems have been developed with a remote aircraft location capability. For a general discussion of moving map display systems reference is made to Publication 83-09-1 issued by the Flight Systems Division of the Bendix Corporation, Teterboro, N.J., 07608.

During normal operation of a moving map display system it may become necessary for the moving map to be frozen at a particular film frame or position. This occurs when the film servo slews to the next contiguous film frame as the aircraft flies off one section of the film to the next. This also occurs when, for example, an observer monitoring a secondary display needs to freeze the moving map at a particular film frame for advanced visibility or mission planning purposes, as the case may be, while the map of the primary display continues to move in accordance with its function as a navigation aid. Prior to the present invention the output display provided by the system would be blanked during the aforenoted slew and no provision was made for otherwise freezing the display for the purposes aforenoted.

In order to accommodate the above situations, the freeze frame apparatus of the invention is utilized to store (freeze) map information just prior to frame to frame slew, or at a predetermined film frame, in dynamic memory for retrieval and continuous display. When the freeze frame function is no longer required the system returns to its normal function.

SUMMARY OF THE INVENTION

This invention contemplates freeze frame apparatus for a moving map display system wherein predetermined video signals provided by the display system are digitized, stored in memory and then retrieved for continuous display. A single high speed analog to digital converter is used for the aforenoted digitizing. The conversion is initiated by freeze frame controller logic. Additionally, a sequential address and a corresponding timing signal are generated to enable storage and retrieval of the digitized video signals from memory. As the data is retrieved from memory it is converted back to video by dedicated high speed video digital to analog converters for transmission to a cockpit display for continuous display.

DETAILED DESCRIPTION OF THE INVENTION

Figure 1:
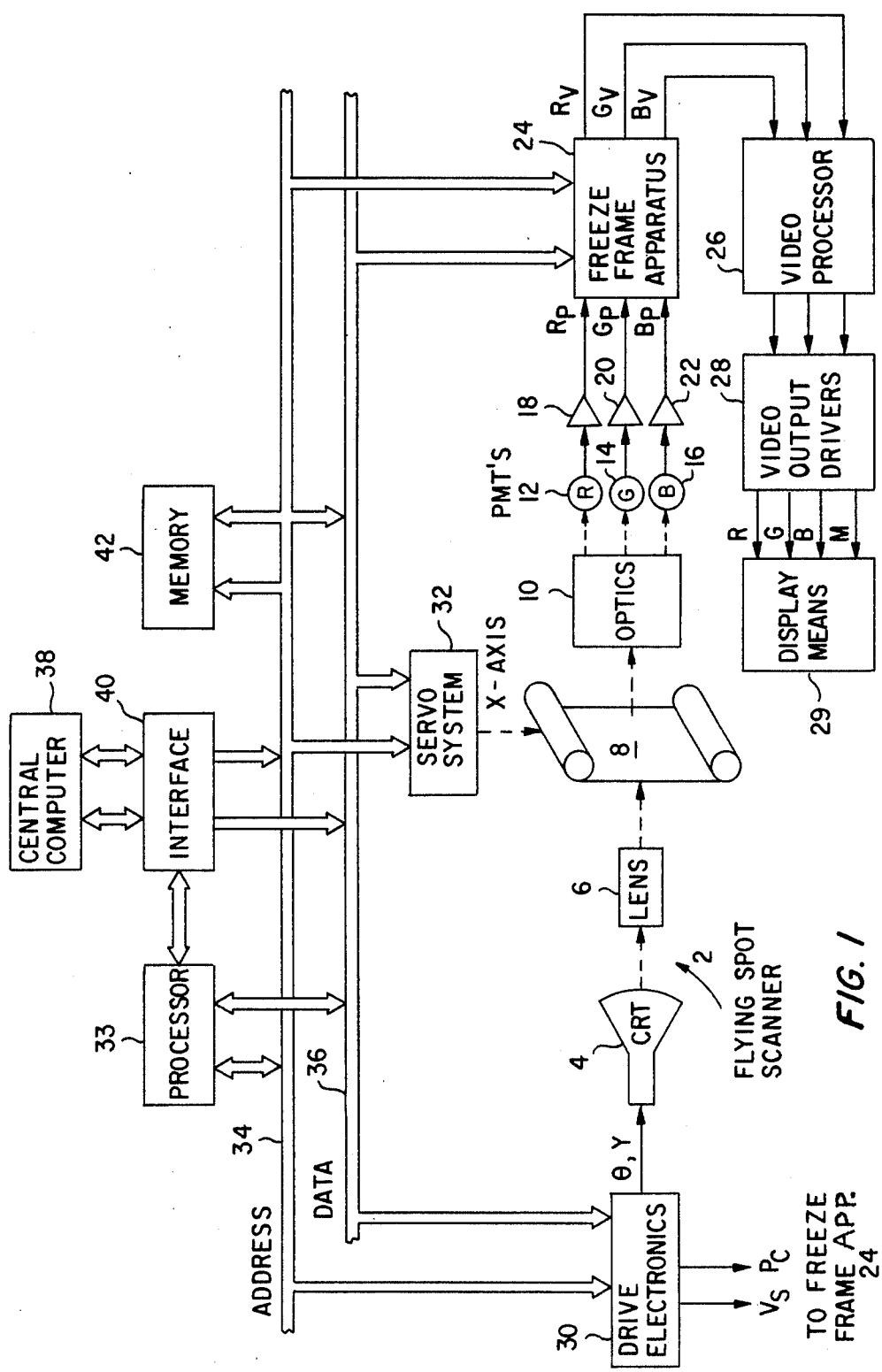
FIG. 1 is a block diagram showing in detail a moving map display system, and generally showing freeze frame apparatus according to the invention.

With reference to FIG. 1, only as much of the moving map display system is shown and will be described as is necessary to understand the invention.

The moving map display system with which the invention may be used features a flying spot scanner designated generally by the numeral 2 and including a cathode ray tube (CRT) 4 and a lens 6. The flying spot scanner is used to illuminate a map film strip 8 with a small spot of light scanning the film strip with, for example, a standard 525 line 60/30 Hz TV raster. The raster so developed is projected on the film strip via lens 6, which is a very high quality reduction lens, to cover only that area on the film strip which is to be displayed. In regard to the flying spot scanner generally, reference is made to the Publication *Flying Spot Scanner System* TSC-1, TSC-2, TSC-3, issued by Nytone, Inc., Salt Lake City, Utah 84101.

Light transmitted through film strip 8 is therefore an instantaneous function of the map image density and color. The magnitude of the red (R), green (G) and blue (B) components of the image is directed via suitable separation optics 10 including filters (not otherwise shown) to photomultipliers (PMT's) 12, 14 and 16, respectively, for converting the primary color components of the transmitted light to video signals. Thus, primary color video signals are generated containing map information for providing a complete map image in a red, green, blue (R,G,B,) format. The signals may be subsequently summed to simultaneously provide a monochromatic output. For purposes of the aforenoted conversion of light to video signals, each PMT has an integral signal amplifier and high voltage power supply (not otherwise shown).

The video signals generated by photomultipliers 12, 14 and 16 are amplified and modified via a channel including video amplifiers 18, 20 and 22 connected to corresponding PMT's 12, 14 and 16, respectively. Each of the amplifiers 18, 20 and 22 is a high gain, wide bandwidth amplifier which increases the level of the detected video signal to required specifications. PMT's 18, 20 and 22 provide analog video signals $R_p$, $G_p$ and $B_p$, respectively.

Upon receiving a suitable command, the freeze frame apparatus of the invention, designated generally by the numeral 24, digitizes analog video signals $R_p$, $G_p$ and $B_p$ from amplifiers 18, 20 and 22 and stores the digitized video signals indefinitely. The stored signals are then retrieved to provide a video output for continuous display. The video output generates, for example, a video picture of 244 visible pixels per horizontal line by 244 visible vertical lines per field, with 64 shades of each primary color red, green and blue.

Thus, signals $R_v$, $G_v$ and $B_v$ from freeze frame apparatus 24 are applied to a video processor 26 and therefrom to video output drivers designated generally by the numeral 28 for providing red (R), green (G), blue (B) and M (Monochromatic) video outputs to provide the aforenoted continuous display at a display means 29 as will now be understood.

Electronic rotation ($\theta$) and Y axis positioning of the raster on flying spot scanner 2 are achieved through inputs from suitable drive electronics 30 connected to CRT 4. Accurate x-axis positioning and slewing of film strip 8 is achieved with a precision high speed film drive servo system 32 which may be suitably coupled to cassette housed film strip 8.

All computations necessary to convert latitude, longitude, heading, track, scale, zoom, center, decenter, etc. to the x, y and $\theta$ positions are accomplished by a processor 33 communicating with drive electronics 30 and servo system 32 via address and data busses 34 and 36. Processor 33 communicates with a central computer 38 via an interface 40. Processor memory is accomplished via a memory device 42 and busses 34 and 36. Processor 33 communicates with freeze frame apparatus 24 via interface 40 and busses 34 and 36, respectively, as shown in the Figure.

Figure 2:
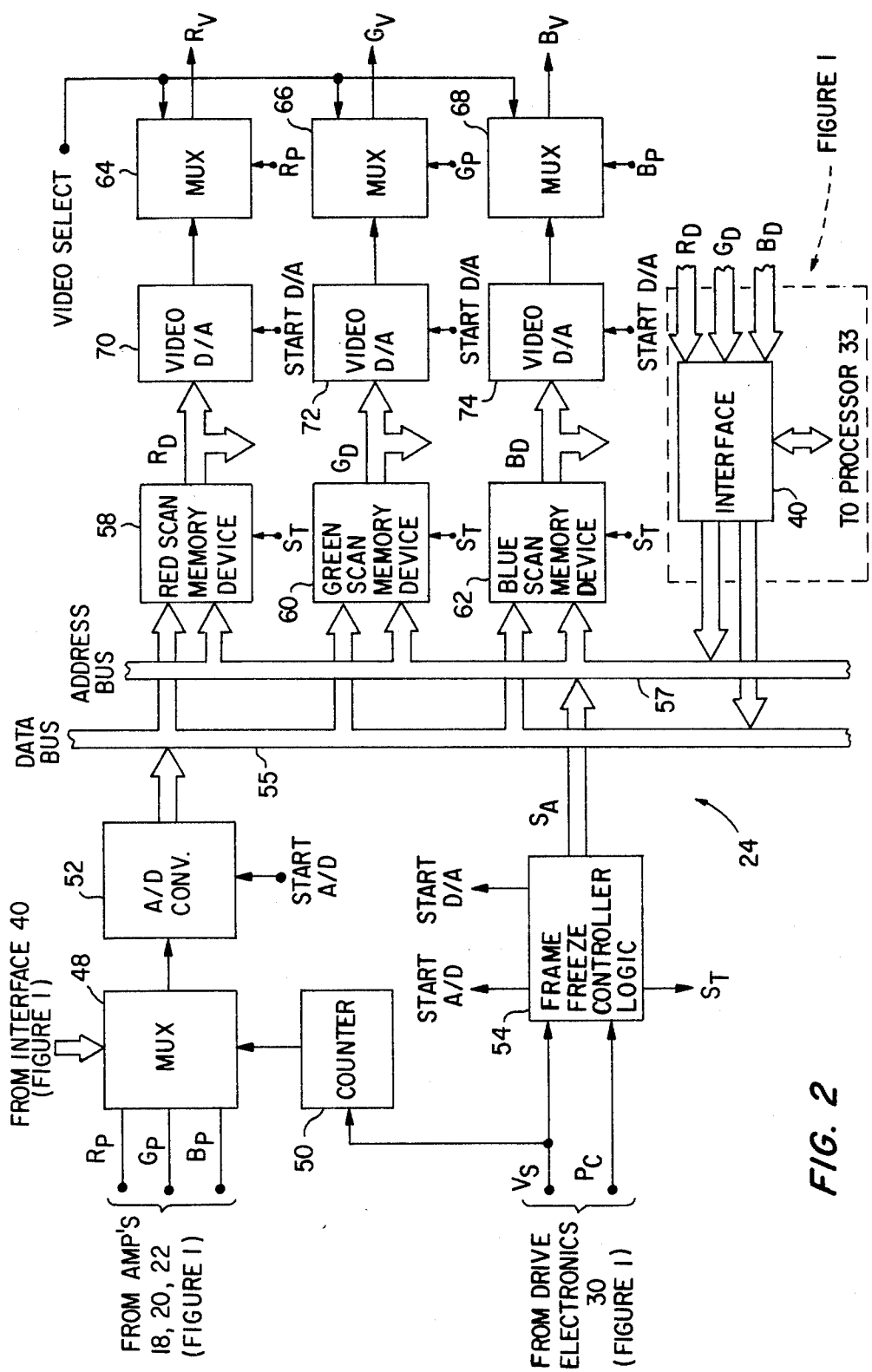
FIG. 2 is a block diagram showing in detail the freeze frame apparatus of the invention, and generally showing a portion of FIG. 1 interacting therewith.

Reference will now be made to FIG. 2, wherein freeze frame apparatus 24 is shown in substantial detail.

Thus, analog video signals $R_p$, $G_p$ and $B_p$ from amplifiers 18, 20 and 22, respectively, shown in FIG. 1, are applied to a multiplexer (MUX) 48. MUX 48, initially in an "on-line" mode, is switched to an "off-line" mode by a freeze frame command from processor 33 via interface 40 as shown in the Figure. MUX 48 is driven by a counter 50 for selecting which of the signals $R_p$, $G_p$ or $B_p$ is to be applied to an analog to digital converter 52. In response to the freeze frame command from processor 33, drive electronics 30 (FIG. 1) provides a synchronizing signal $V_s$ and a pixel clock signal $P_c$. Counter 50 is triggered by signal $V_s$ to drive MUX 48. Freeze frame controller logic 54 is responsive to signal $V_s$ for providing start A/D and start D/A signals, and is responsive to signal $P_c$ for providing a timing signal $S_T$ and a sequential address signal $S_A$. Signals $S_A$ and $S_T$ are applied to enable storage and retrieval of digital video signals from scan memory devices to be hereinafter described. The start A/D signal from freeze frame controller 54 is applied to analog to digital (A/D) converter 52 to start the conversion of video signals $R_p$, $G_p$ and $B_p$ from MUX 48. Signal $V_s$ insures that the analog to digital conversion is synchronized to start with vertical synchronization of the raster provided by flying spot scanner 2 (FIG. 1).

The digital signals from A/D converter 52 are applied over a data bus 55 to red, green and blue scan memory devices designated by the numerals 58, 60 and 62, respectively. Memory devices 58, 60 and 62 respond to signal $S_A$ applied over an address bus 57 to store the digital video signals from converter 52, and respond to signal $S_T$ to retrieve the digital signals from the memory devices.

The digitizing process as accomplished by A/D converter 52 is performed within a relatively short interval such as, for example, 100 milliseconds. In this regard A/D converter 52 is a high speed (25 mega samples per second, for example) converter for digitizing the aforenoted red, green and blue primary colors. During the digitizing time signals $R_v$, $G_v$ and $B_v$ are provided for display via video processor 26, video output drivers 28 and display means 29 (FIG. 1).

When the aforenoted digitizing is completed digital video signals $R_D$, $G_D$ and $B_D$ are provided by scan memory devices 58, 60 and 62, respectively. Processor 33 provides a video select signal which switches output multiplexers 64, 66 and 68, receiving signals $R_p$, $G_p$ and $B_p$, respectively, to select and hence retrieve the stored map video signals. This switching is performed during the aforenoted vertical retrace period to avoid any undesirable flicker of the display, as is desirable.

As the digital signals are retrieved from scan memory devices 58, 60 and 62 they are converted into video analog signals by video digital to analog converters (D/A) 70, 72 and 74, respectively. This conversion is started by the start D/A signal from freeze frame controller logic 54 (FIG. 1). These converters are likewise high speed converters of the type having chip data registers and carefully matched current sources so that any output glitches are small and no deglitcher circuits are required, as is desirable. The analog outputs are applied to the respective multiplexers 64, 66 and 68 for the aforenoted purpose to provide video outputs $R_v$, $G_v$ and $B_v$ for processing as heretofore described with reference to FIG. 1.

When the freeze frame function has been completed, processor 33, provides a command via interface 40 which switches multiplexer 48 back to the "on-line" scanned map video mode. This switching is likewise performed during the vertical retrace period to avoid flicker of the display.

A built in test (BIT) capability is implemented as shown in FIG. 2. In this regard, converter 52 is tested by switching in a fixed analog signal from processor 33 via interface 40, converting and storing the resultant digital signals as heretofore described, and then verifying signals $R_D$, $G_D$ and $B_D$ in each of the scan memory devices 58, 60 and 62.

It will thus be seen that the freeze frame apparatus of the invention converts the three primary digital signals $R_p$, $G_p$ and $B_p$ into digital signals, stores the digital signals indefinitely, then reproduces the stored information for continuous display during the freeze frame period. By placing freeze frame apparatus 24 between amplifiers 18, 20 and 22 and video processor 26 (FIG. 1), both the color and monochromatic outputs R, G, B and M provided by video output drivers 28 are frozen with a minimum amount of electronics. Significantly, video processor 26 remains independent of the freeze frame function.

With the above description of the invention in mind, reference is had to the claims appended hereto for a definition of the scope of the invention.

What is claimed is:

1. In association with a system for converting a map on a moving film to a moving map video display, said system providing analog video signals corresponding to the frame position of the moving film, apparatus for providing a continuous video display of the map at a predetermined frozen film frame position, said apparatus comprising:

means for converting analog video signals corresponding to the predetermined frozen film frame position into digital signals including
multiplexer means responsive to the command for being switched from a system "on-line" mode to a system "off-line" mode for selecting analog video signals corresponding to the predetermined frozen film frame position,
counter means connected to the multiplexer means and responsive to the synchronizing signal from the system for driving the multiplexer means in accordance with the vertical synhcronization of the raster of the moving map video display, controller means responsive to the synchronizing signal from the system for providing a first start signal in accordance with said vertical synchronization, and analog to digital converter means connected to the multiplexer means and to the controller means, and responsive to the first start signal from the controller means for converting the analog video signals selected by the multiplexer means to digital signals;

means for storing the digital signals;

means for converting the stored digital signals to analog video signals;

means for retrieving the analog video signals; and means responsive to the retrieved analog video signals for providing a continuous video display of the map at the predetermined frozen film frame position, wherein the system is responsive to a command for providing a synchronizing signal in accordance with the vertical synchronization of the raster of the moving map video display.

2. Apparatus as described by claim 1, in which the system is responsive to the command for providing a clock signal, and the means for storing the digital signals comprises:

the controller being responsive to the clock signal for providing an address signal; and memory means connected to the analog to digital converter means and to the controller means, and responsive to the address signal for storing the digital signals from the analog to digital converter means.

3. Apparatus as described by claim 2 wherein:

the controller means is responsive to the clock signal for providing a timing signal; and the memory means is connected to the controller means and responsive to the timing signal for providing the stored digital signals.

4. Apparatus as described by claim 3, in which the means for converting the digital signals into analog video signals includes:

the controller means being responsive to the synchronizing signal from the system for providing a second start signal in accordance with said vertical synchronization; and digital to analog video converter means connected to the memory means and to the controller, and responsive to the second start signal for converting the digital signals into analog video signals.

5. Apparatus as described by claim 4, further comprising:

the system including means for providing a video select signal; and output multiplexer means connected to the digital to analog video converter means, and responsive to the video select signal and the analog video signals correspoding to the predetermined frozen film frame position, for retrieving the analog video signals.

6. Apparatus as described by claim 1, wherein:

the analog video signals are primary color video signals for providing the display in a red-green-blue format.

7. Apparatus as described by claim 1, wherein the multiplexer means being responsive to another command at the end of the continuous video display of the map at the predetermined frozen film frame position for being switched from the system "off-line" mode to the system "on-line" mode.

8. Apparatus as described by claim 1, including built in test means comprising:

means for switching in a fixed analog video signal to the means for converting analog video signals corresponding to the predetermined frozen film frame position into digital signals, said converting means converting the fixed analog signal to test digital signals, wherein the means for storing the digital signals storing the test digital signals and verifying said signals with the stored digital signals.

* * * * *